United States Patent [19]
Shtipelman et al.

[11] Patent Number: 5,872,768
[45] Date of Patent: Feb. 16, 1999

[54] OPTICAL DISCS WITH COVER SHEETS AND PRESSURE EQUALIZATION OF THE ENCLOSED AIR

[75] Inventors: Boris A. Shtipelman, Rochester; James A. Barnard, Scottsville; Charles J. Simpson, Rochester, all of N.Y.

[73] Assignee: Eastman Kodak Company, Rochester, N.Y.

[21] Appl. No.: 755,747

[22] Filed: Nov. 22, 1996

[51] Int. Cl.⁶ ........................................................ G11B 3/70
[52] U.S. Cl. ............................................................ 369/291
[58] Field of Search ................................... 369/291, 284, 369/286, 283, 290; 346/137; 360/137, 133

[56] References Cited

U.S. PATENT DOCUMENTS

| | | | |
|---|---|---|---|
| 4,499,996 | 2/1985 | Coyle | 360/133 |
| 4,504,842 | 3/1985 | Odawara | 369/284 |
| 4,507,774 | 3/1985 | Marchant | 369/271 |
| 4,539,573 | 9/1985 | Marchant et al. | 346/137 |
| 4,873,594 | 10/1989 | Chen | 360/97.03 |
| 4,972,404 | 11/1990 | Yamaguchi et al. | 369/291 |

FOREIGN PATENT DOCUMENTS 61-180947  8/1986  Japan ........................................ 369/291

Primary Examiner—Allen T. Cao
Attorney, Agent, or Firm—Raymond L. Owens

[57] ABSTRACT

An optical disc is disclosed having a substrate in which data can be written on or read from, such optical disc has a transparent cover sheet which is held at a desired spacing from the substrate at least at an inner radius and an outer radius. In order to prevent the transparent cover sheet from deflecting due to pressure differences between the outside atmosphere and the air in the space between the substrate surface and the transparent cover sheet, a plurality of air passages in the transparent cover sheet are provided near an inflection point where on one lateral side of the point the transparent sheet will bulge and on the other lateral side it will be depressed due to centrifugal force acting upon air entrapped between the transparent cover sheet and the substrate surface during disc rotation in an optical disc drive. This arrangement equalizes the pressure in the air space between the transparent cover sheet and the substrate surface and the outside atmosphere.

7 Claims, 7 Drawing Sheets

OPTICAL DISCS WITH COVER SHEETS AND PRESSURE EQUALIZATION OF THE ENCLOSED AIR

CROSS REFERENCE TO RELATED APPLICATIONS

The present invention is related to U.S. patent application Ser. No. 08/756,197, entitled "Air Sandwiched Optical Discs With Closeable Pressure Relief Holes", filed concurrently herewith, and U.S. patent application Ser. No. 08/755,085, entitled "Optical Discs With Cover Sheets and Dynamic Pressure Stabilization of the Enclosed Air", filed concurrently herewith, assigned to the assignee of the present invention. The disclosure of these related applications is incorporated herein by reference.

FIELD OF THE INVENTION

This invention relates to optical discs with cover sheets.

BACKGROUND OF THE INVENTION

As with all information storage devices, the recording surface of an optical disc must be protected from dust, small particles, or any other source of contamination. Since optical drives use removable media, such a protection is usually incorporated in the disc design. For instance, the widely used compact discs of various formats incorporate a layer of transparent plastic to separate the recording surface from the outside world. Such a surface in a 355.6 mm in diameter optical disc is protected by a polycarbonate transparent cover sheet. The latter is radially tensioned and sealed to a spacer and a perimeter ring at the inner and outer radii of the disc, respectively. The space under the cover sheet is filled with air enclosed there during assembly of the disc. Obviously, the barometric pressure of air under the cover sheet (equal to the air pressure in the clean room during assembly) and the atmospheric pressure of air surrounding the disc during drive operation may have different values. This will create a pressure differential for the air inside and outside the disc resulting in deflection of the cover sheet.

Due to centrifugal forces during disc rotation, the air under the cover sheet will be displaced toward the outside periphery of the disc. This air motion will result in additional deflection of the cover sheet. Its original surface will be transformed into a more complicated shape that may result in catastrophic conditions when the cover sheet touches the objective lens (at the outer radius) or the substrate (at the inner radius). For examples of optical discs with cover sheets, see commonly assigned U.S. Pat. Nos. 4,507,774 and 4,539,573.

Referring to FIGS. 1 and 2, a prior art two-sided optical disc has a substrate 10 which is protected from the outside world by transparent cover sheets 20 and 30. The disc is provided with a central opening 70. Each sheet is radially tensioned and sealed to spacers 40 or 50 and to a perimeter ring 60 at the inner and outer radii of the disc, respectively. Since the spacer thicknesses are larger than the height of the ring, the space under the cover sheet represents a frustum of a cone. Its volume is filled with air enclosed there during assembly of the disc.

As stated above, the barometric pressure of air under the cover sheet (equal to the air pressure in the clean room during assembly) and air surrounding the disc during drive operation may have different values. This will create some pressure differential for the air inside and outside the disc that will result in deflection of the cover sheet. Several graphs are shown in FIG. 3 illustrating the deformed cover sheet when the optical disc is placed at different altitudes. With increased altitudes above the sea level, the air pressure in the surrounding atmosphere is decreasing resulting in the cover sheet bulging. In such conditions, when the disc is used in the drive, the cover sheet may touch the objective lens of the optical head making reading or writing impossible. Similarly, at decreasing altitudes below the sea level, the air pressure of the surrounding atmosphere is increasing that deflects the cover sheet toward the substrate. If at high levels of pressure differentials the cover sheet touches the substrate, reading or writing becomes once again impossible. To avoid such catastrophic cases, the cover sheet deflection due to pressure differentials must be reduced or eliminated completely.

On top of that, when the disc is rotated in the optical drive, centrifugal forces will displace the air in the air space under the cover sheet toward the outside periphery of the disc. This will decrease the pressure of the entrapped air at the inner zone of the disc and increase the air pressure at the outer part of the disc. As a result, additional deflection of the cover sheet will occur transforming the latter into an S-shaped sheet. Such a case is illustrated in FIG. 4 where several graphs show the deflected shape of the cover sheet due to disc rotation at various angular velocities. With the increasing number of revolutions per minute (rpm) in disc rotation, the S-shaped cover sheet deflects at higher rates that may bring the cover sheet in contact with the substrate of the disc or the objective lens of the optical head.

Each graph in FIG. 4 was derived by an experimentally verified mathematical model developed to describe the cover sheet behavior at different conditions. As seen here, graphs for deflected cover sheet due to disc rotation intersect the original cover sheet of a stationary disc at the same so-called inflection point where on one lateral side of the point the cover sheet will bulge and on the other lateral side it will be depressed. At the inflection point, no deflection of the cover sheet occurs since at that point the air pressure has the same value if measured outside and inside the disc. This phenomena is observed only when the disc operation takes place at any altitude but with the air pressure inside and outside the disc statically equalized before rotation starts.

With the deflected cover sheet due to static pressure differentials, avoiding catastrophic cases of drive operation when the sheet touches the substrate or the objective lens may be achieved by lowering the difference in pressure values of the air entrapped under the cover sheet during the disc assembly and air surrounding the disc when it is used at various altitudes.

SUMMARY OF THE INVENTION

It is an object of the present invention to provide effective pressure stabilization of enclosed air in optical discs with cover sheets.

Another object of this invention is to eliminate static pressure differential for the air inside and outside the disc.

This object is achieved by an optical disc having a substrate in which data can be written on or read from, such optical disc having a transparent cover sheet, means for holding the cover sheet at a desired spacing from the substrate at least at an inner radius and an outer radius, means for preventing the transparent cover sheet from deflecting due to pressure differences between the outside atmosphere and the air in the air space between the substrate surface and the transparent cover sheet comprising:

a) spacer means defining a plurality of openings in the transparent cover sheet near an inflection point where on one lateral side of the point the transparent sheet will bulge and on the other lateral side it will be depressed due to centrifugal force acting upon air entrapped between the transparent cover sheet and the substrate surface during disc rotation in an optical disc drive, thereby equalizing the pressure in the air space between the transparent cover sheet and the substrate surface and the outside atmosphere.

ADVANTAGES

It is an advantage of the present invention in optical discs protected by cover sheets for decreasing ballooning and deflection of this sheet while the disc is used at different altitudes where atmospheric pressure is changing without contaminating the space between the sheet and the disc surface. Also, the present invention permits the "breathing" of the air space during rotation of the optical disc absent in the prior art.

The present invention creates a condition when the pressure differential for the air inside and outside the disc is substantially decreased or eliminated completely.

DETAILED DESCRIPTION OF THE INVENTION

The present invention eliminates static pressure differential for the air inside and outside the disc by providing a plurality of "breathing" air passages in the circular area around the inflection point of the disc permitting the air to flow between the air space under the cover sheet and the outside atmosphere. It should be noted, however, that since the air pressure at the inflection point is the same if measured inside and outside the disc, the "breathing" air passages can be left open to the surrounding atmosphere for all angular velocities of the rotating disc.

Figure 1:
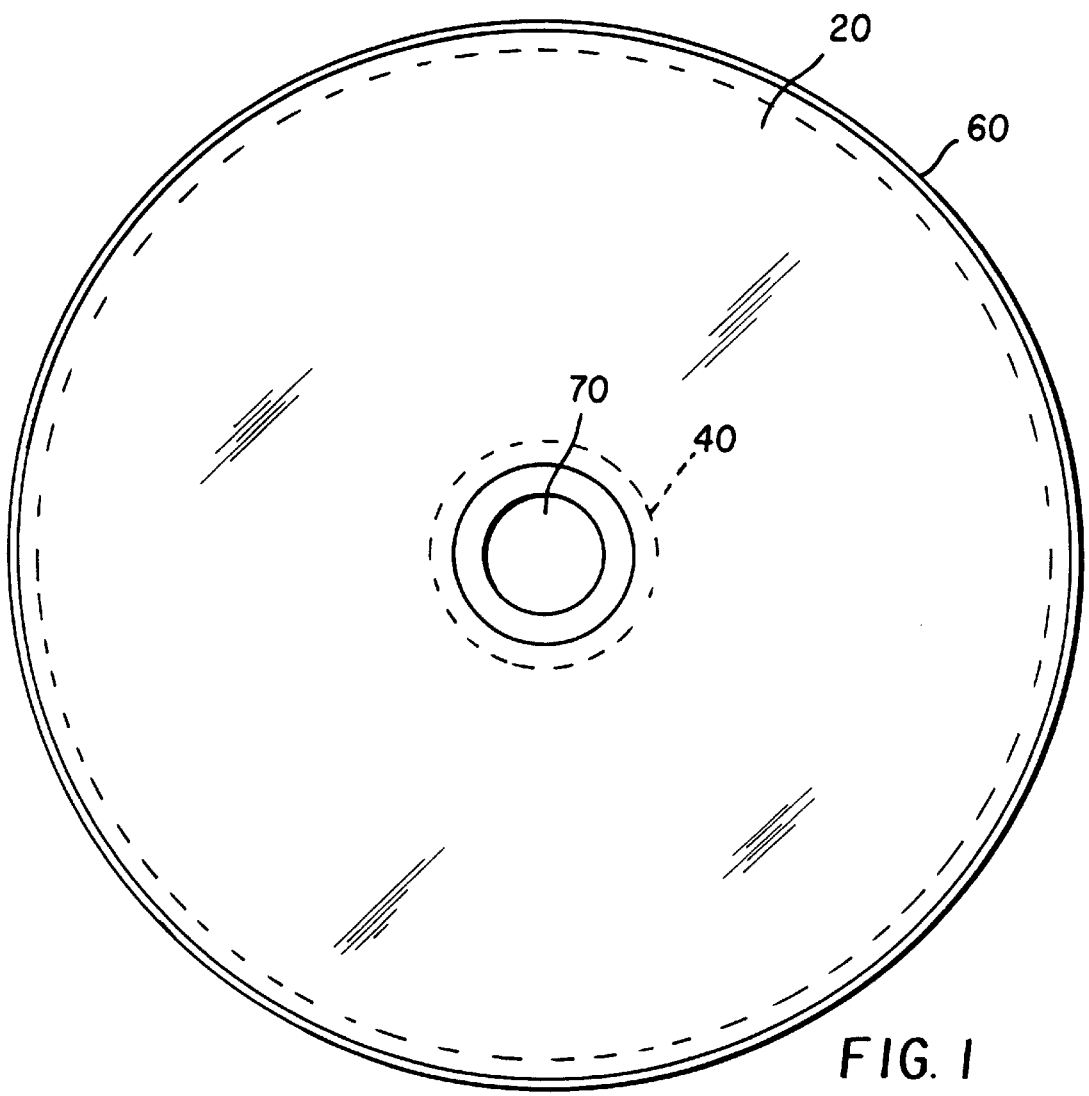
FIG. 1 is a top view of a prior art optical disc equipped with a cover sheet.
Figure 2:
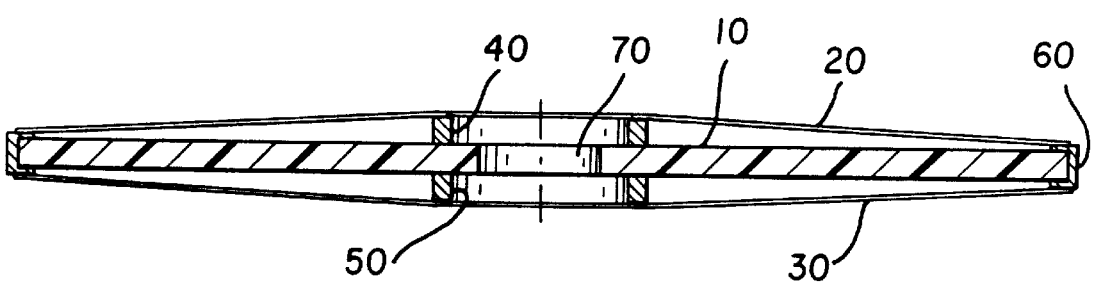
FIG. 2 is a radial cross section of the optical disc of FIG. 1.
Figure 3:
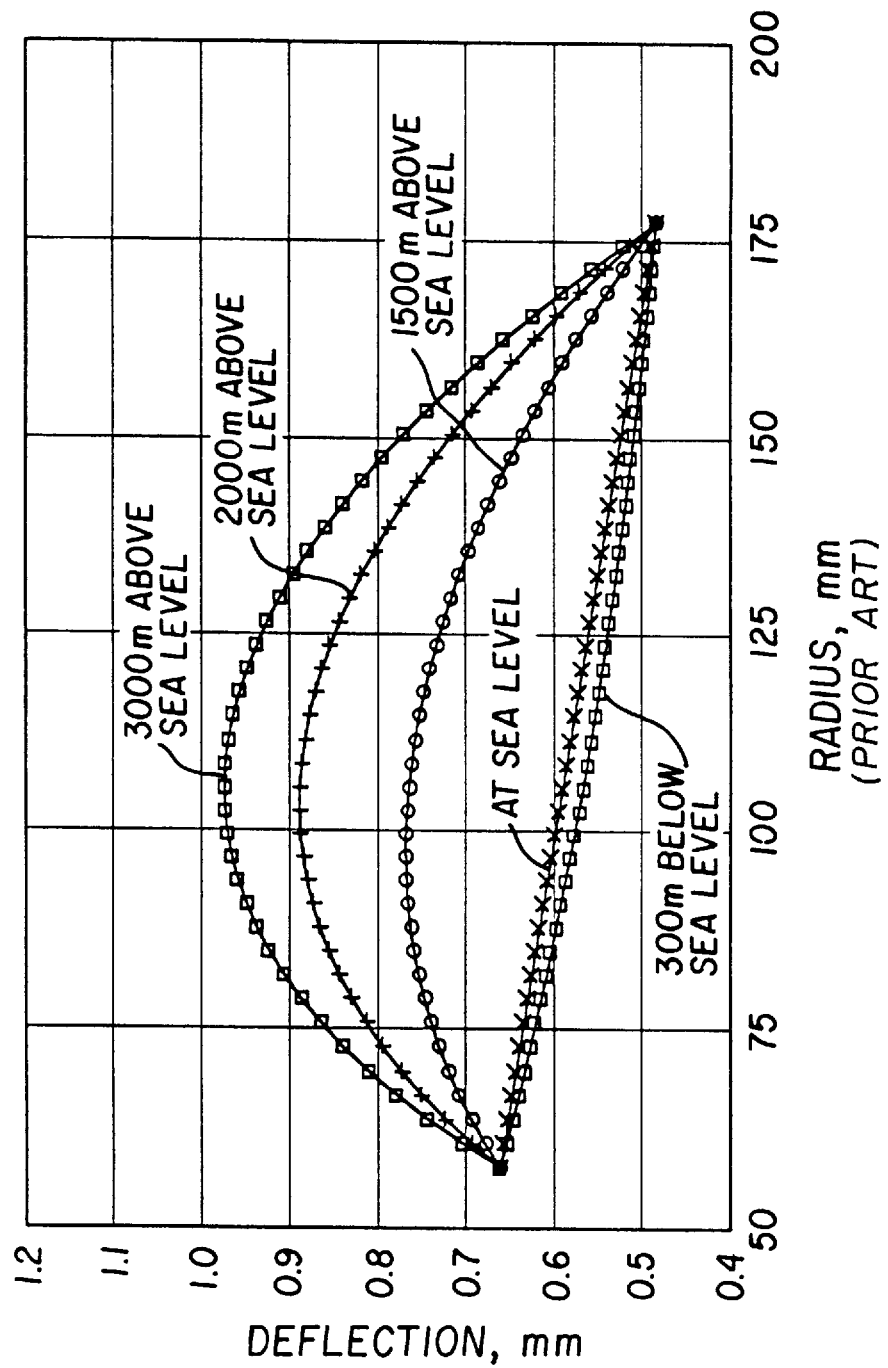
FIG. 3 is a plot of deflection vs. radius for the cover sheet of FIG. 1 showing deflection for the disc placed at different altitudes with changing air pressure of the surrounding atmosphere.
Figure 4:
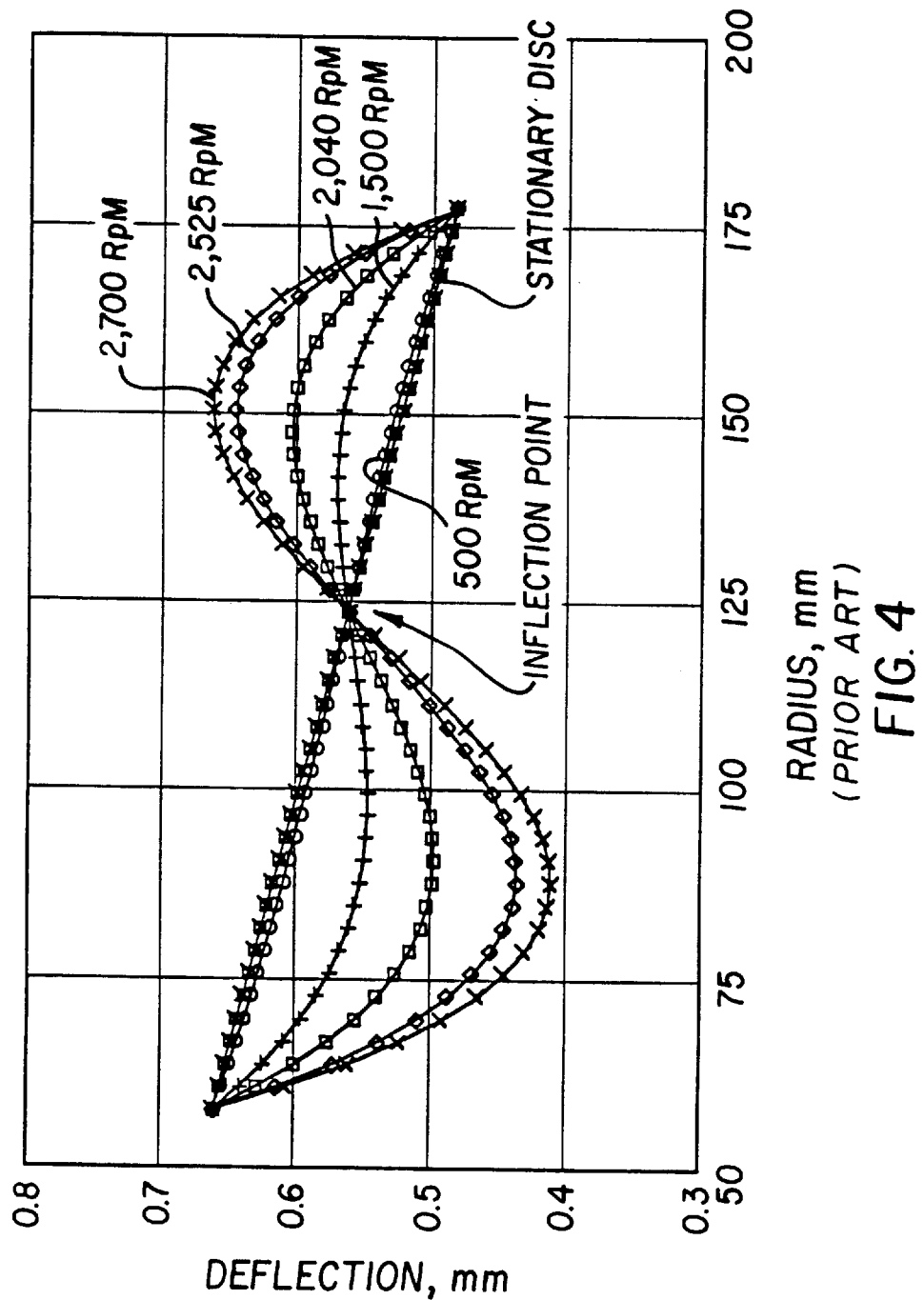
FIG. 4 depicts graphs of deflection vs. radius for a typical optical disc cover sheet showing that there is a point of inflection of the cover sheet when the cover sheet deflects during rotation of the disc and that this point is substantially the same irrespective of the rotational velocity of the disc.
Figure 5:
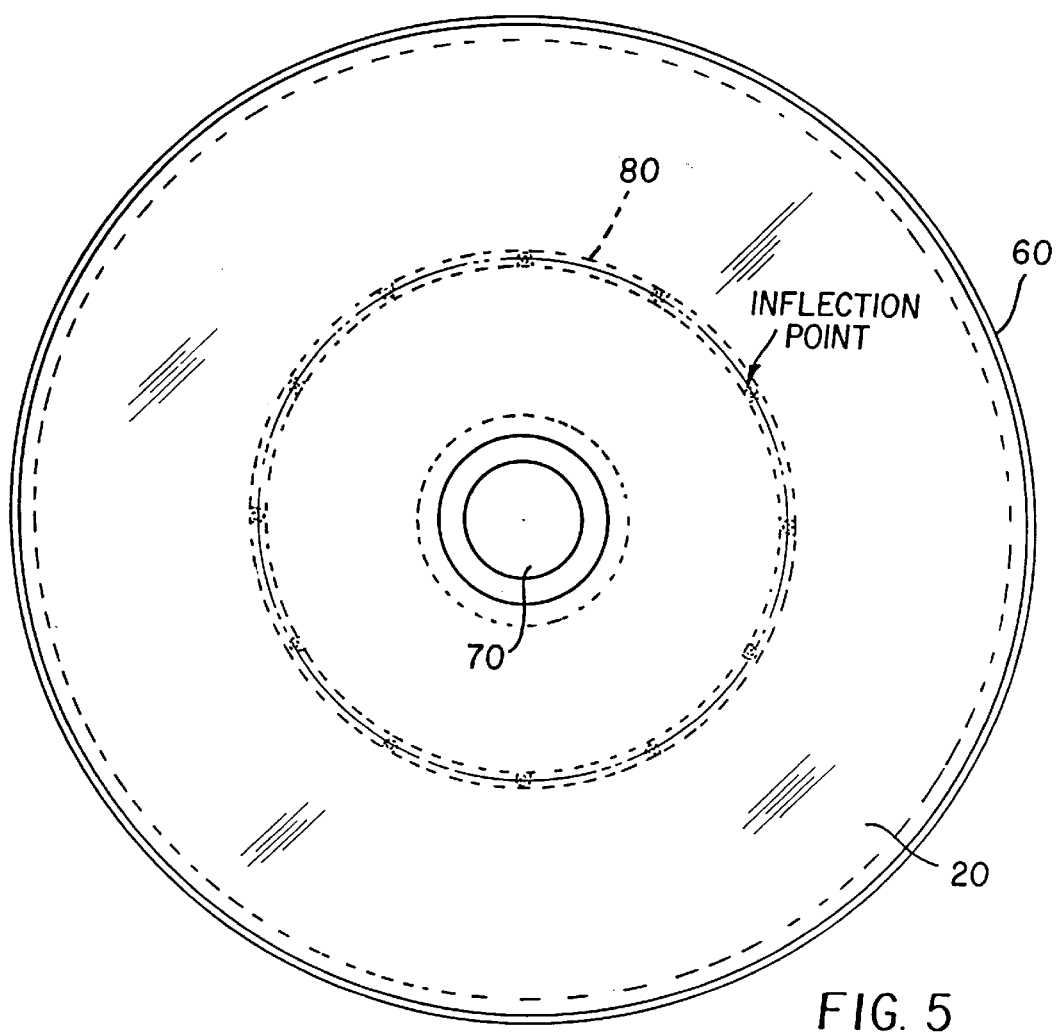
FIG. 5 is a top view of an optical disc similar to FIG. 1 but with a plurality of openings in the cover sheet at the inflection point where on one lateral side of the point the sheet will bulge and on the other lateral side it will be depressed due to centrifugal forces acting upon entrapped air during disc rotation in an optical drive.
Figure 6:
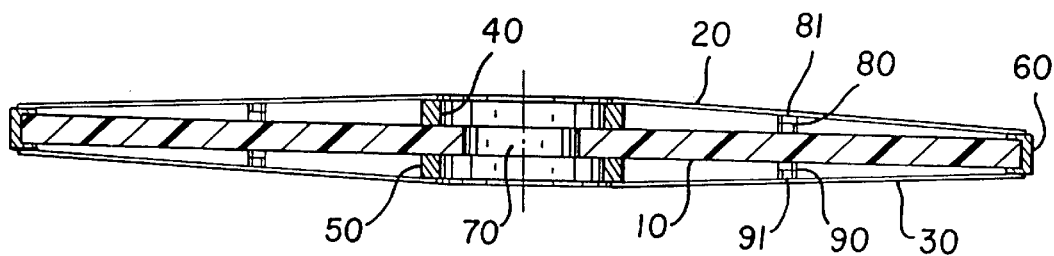
FIG. 6 is a radial cross section of the optical disc of FIG. 5.

Turning now to FIGS. 5 and 6, the general arrangement of structures in accordance with the present invention can be seen. Features of these structures shown in FIGS. 5 and 6 will be described with reference to FIGS. 7–12. In the top view of the disc shown in FIG. 5, a plurality of "breathing" air passages in a top circular spacer 80 and the cover sheet 20 are located around the circle passing through the inflection point. Similar air passages in a bottom circular spacer 90 and the cover sheet 30 are illustrated in FIG. 6.

Figure 7:
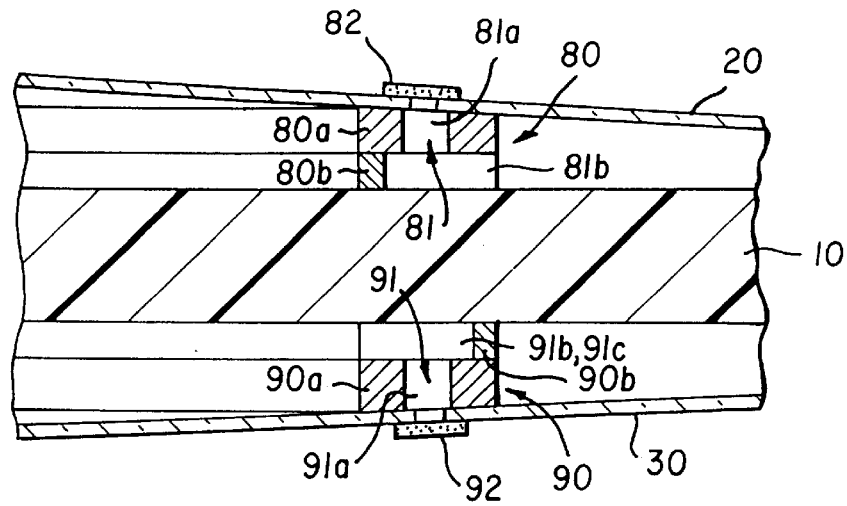
FIG. 7 is an enlarged partial view of a portion of the optical disc showing spacers which can be used in the FIG. 6 arrangement in accordance with a preferred embodiment of the invention.

Turning now to FIG. 7, the spacers 80 and 90 are shown in more detail in a first embodiment. The air passages in these spacers are also presented in FIG. 8 where a partial top view of the disc is illustrated. As shown, the top spacer 80 is made of two elements 80a and 80b with holes 81a provided in element 80a and cutouts 81b and 81c in element 80b. This spacer 80 with both elements 80a and 80b can be manufactured as a singular part by injection molding. The direction of cutouts 81b and 81c are alternating permitting both the inner and outer zones of the disc to be connected to the outside atmosphere. With the cover sheet 20 sealed to spacer 80 along circular traces 83 and 84 (see FIG. 8), holes 81a and cutouts 81b and 81c connect the space under the cover sheet 20 with the atmosphere surrounding the disc. This allows an air passage either from the outside atmosphere into the areas of the disc under the cover sheet, or in the opposite direction, depending upon the differential pressure in those two areas. Such a passage will allow the air pressure inside and outside the disc to be statically equalized at any altitude. To protect the recording surface of the disc from any outside contamination, the "breathing" air passages 81 are covered with a continuous ring of filtering material or separate filters 82. In a similar fashion, as shown in FIG. 7, a bottom spacer 90 is formed of two elements 90a and 90b and includes air passages 91 that combine holes 91a and alternating cutouts 91b. Filters 92 are also provided.

Figure 8:
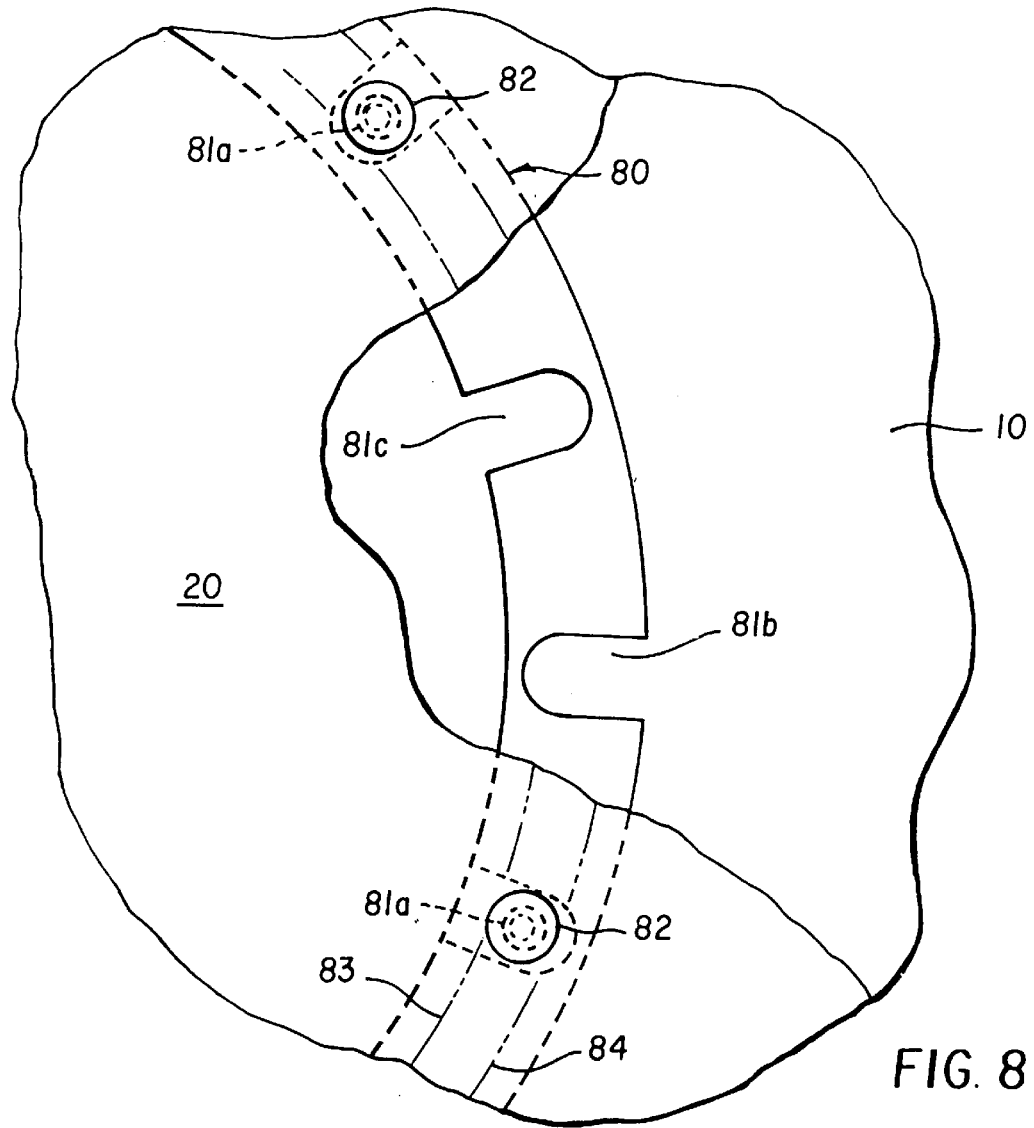
FIG. 8 is a partial top view of the optical disc shown in FIG. 7.
Figure 9:
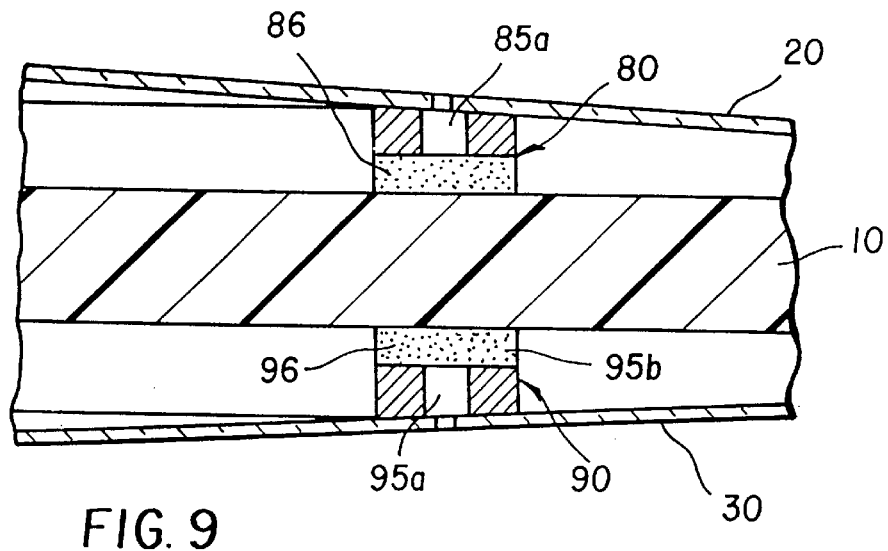
FIG. 9 is an enlarged partial view of the optical disc similar to FIG. 7 but showing different spacers in accordance with another embodiment of the present invention.
Figure 10:
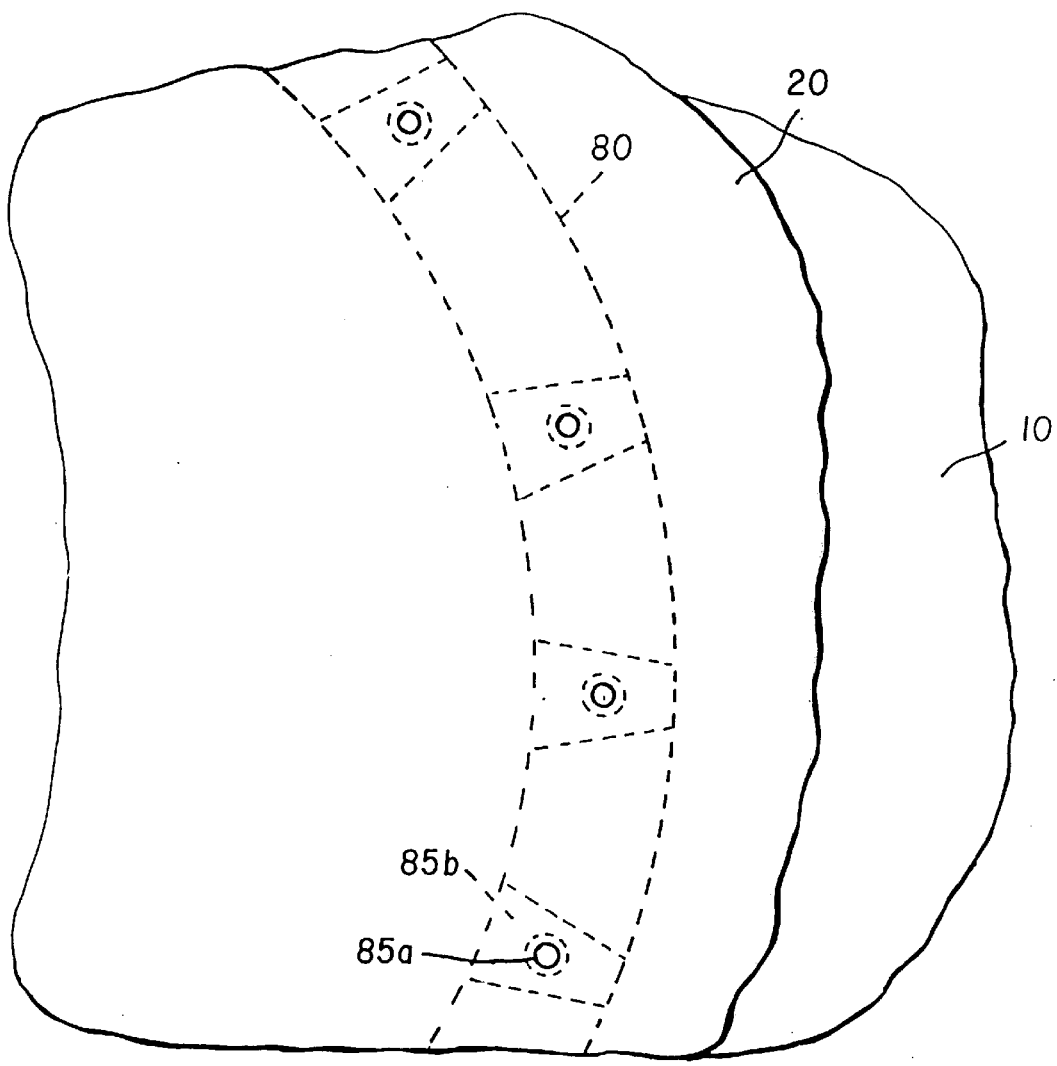
FIG. 10 is a partial top view of the optical disc of FIG. 9.

Another embodiment of the invention is demonstrated in FIGS. 9 and 10 where, similar to FIGS. 7 and 8, circular spacers 80 and 90 are located around the inflection points and have "breathing" holes 85a and 95a combined with through-cutouts 85b (similar cutouts 95b in spacer 90 are not shown) in the bottom portions of each spacer. These cutouts are filled with filters 86 and 96 and have a wedge type shape so that filters will be locked in the wedged space of the cutouts when centrifugal forces are applied to them during disc rotation.

Figure 11:
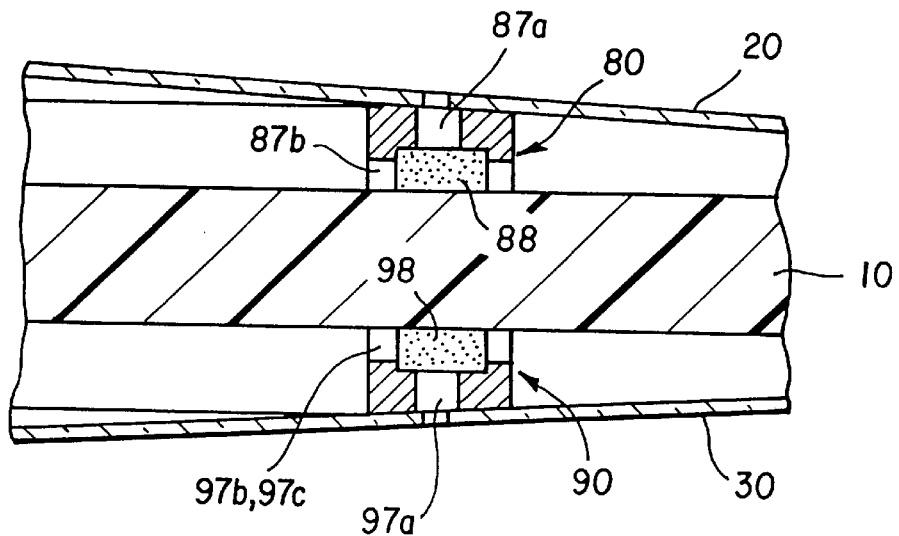
FIG. 11 is an enlarged partial view of the optical disc similar to FIG. 7 but showing different spacers in accordance with another embodiment of the present invention.
Figure 12:
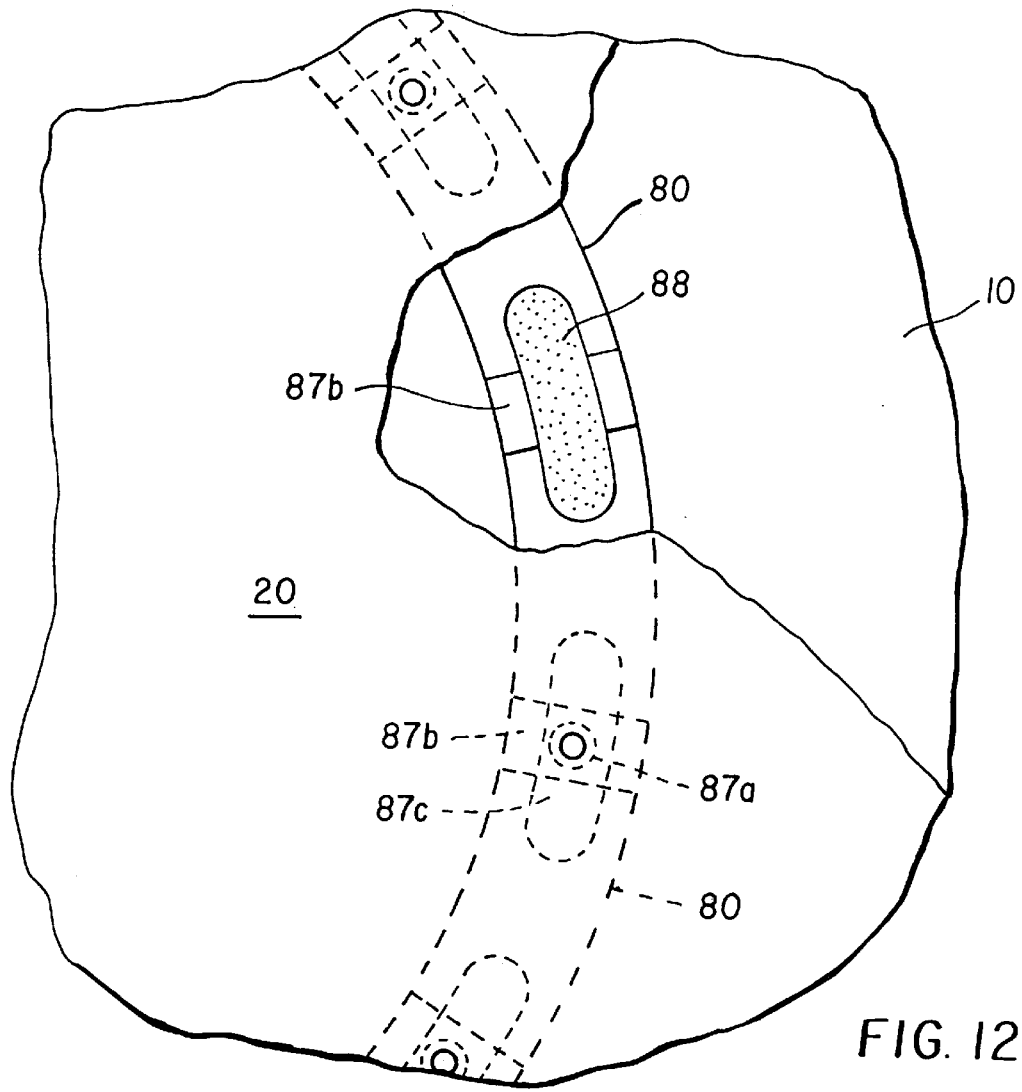
FIG. 12 is a partial top view of the optical disc of FIG. 11.

One additional embodiment of the invention is illustrated in FIGS. 11 and 12 where, similar to FIGS. 7 and 8, circular spacers 80 and 90 are located around the inflection points and have "breathing" holes 87a and 97a combined with through-cutouts 87b and circular spaces 87c (similar cutouts 97b and spaces 97c in spacer 90 are shown in FIG. 11) in the bottom portion of each spacer. Each circular space 87c and 97c is filled with filters 88 and 98 to protect the recording surface of the disc from any outside contamination.

The invention has been described in details with particular reference to preferred embodiments thereof, but it will be understood that variations and modifications can be effected within the spirit and scope of the invention.

We claim:

1. An optical disc having a substrate in which data is written on or read from, said optical disc having a transparent cover sheet, means for holding the cover sheet at a desired spacing from the substrate at least at an inner radius and an outer radius, means for preventing the transparent cover sheet from deflecting due to pressure differences between the outside atmosphere and the air in the space between the substrate surface and the transparent cover sheet comprising:

spacer means defining a plurality of openings in the transparent cover sheet substantially at an inflection point where on one lateral side of the point the transparent sheet will bulge and on the other lateral side it will be depressed due to centrifugal force acting upon air entrapped between the transparent cover sheet and the substrate surface during disc rotation in an optical disc drive, thereby equalizing the pressure in the air space between the transparent cover sheet and the substrate surface and the outside atmosphere.

2. The optical disc of claim 1 wherein the spacer means is secured to the substrate and sealed to the cover sheet and provides air passages from the outside atmosphere to the air space.

3. The optical disc of claim 2 further including filter means provided over the air passages to prevent contaminants from the atmosphere from entering into the air space.

4. The optical disc of claim 2 wherein the spacer means forms the air space to be divided into inner and outer chambers, wherein the inside chamber extends from the inner radius of the disc to the spacer means and the outside chamber extends from the spacer means to the outer radius of the disc.

5. The optical disc of claim 4 wherein the passages defined by the spacer means alternately extend between the inner and outer chambers.

6. The optical disc of claim 4 wherein the passages include wedge shaped cutouts and the filtering means includes filters disposed in the cutouts and the passages extend between the inner and outer chambers.

7. The optical disc of claim 3 wherein the spacer means forms filter receiving cavities and filters are disposed in such filter receiving cavities, the passages extending between the inner and outer chambers and arranged so that air which passes between the chambers and the outside atmosphere must pass through the filters.

* * * * *